Patented Sept. 18, 1923.

1,468,342

UNITED STATES PATENT OFFICE.

CHARLES D. CASSADY, OF ORLANDO, FLORIDA.

INSECTICIDE.

No Drawing.　　　Application filed April 2, 1921.　Serial No. 458,021.

*To all whom it may concern:*

Be it known that I, CHARLES D. CASSADY, a citizen of the United States, residing at Orlando, in the county of Orange and State of Florida, have invented new and useful Improvements in Insecticides for the Destruction of Boll Weevil, Potato Bugs, and Other Insects Injurious to Plant Life, of which the following is a specification.

The invention relates to an insecticide for the destruction of boll weevil, potato bugs and other insects injurious to plant life.

My composition consists in the following ingredients in the proportions herein stated, viz.

| | Oz. |
|---|---|
| Carbolic acid | 16 |
| Paraffin oil | 28 |
| Caustic soda | 14 |
| Red oil | 40 |
| Oil of mirbane | 30 |

These ingredients are mixed together with sufficient water to make a one-gallon mixture or solution which, when it is desired to use or put up the same for use, is diluted sufficiently with water to make a forty-gallon solution.

The red oil prevents the separation of the solution or mixture into its constituent elements and also prevents dew, mist and rain from washing the solution off the plants after the same have been sprayed. The carbolic acid serves to poison the boll weevil, potato bug or other insect and the caustic soda cooks the solution. The paraffin oil and the oil of mirbane serve to retain the strength of the poison of the solution which has proven a success in the destruction of insects particularly the boll weevil. The solution is designed to be applied to the plants by spraying the same but it may be sprinkled or poured or applied in any other manner.

What is claimed is:

1. The herein described insecticide composition consisting of carbolic acid, paraffin oil, caustic soda, red oil and oil of mirbane in proportion to form a compound readily miscible with water for spraying.

2. The herein described insecticide composition in quantities approximately in the proportion of carbolic acid sixteen ounces, paraffin oil twenty-eight ounces, caustic soda fourteen ounces, red oil forty ounces and oil of mirbane thirty ounces.

In testimony whereof I have hereunto set my hand.

CHARLES D. CASSADY.